(12) United States Patent
Frey et al.

(10) Patent No.: US 11,047,240 B2
(45) Date of Patent: Jun. 29, 2021

(54) CMC COMPONENTS HAVING MICROCHANNELS AND METHODS FOR FORMING MICROCHANNELS IN CMC COMPONENTS

(71) Applicant: General Electric Company, Schenectady, NY (US)

(72) Inventors: David Alan Frey, West Chester, OH (US); Kirk Douglas Gallier, Liberty Township, OH (US); Herbert Chidsey Roberts, Middletown, OH (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 15/592,516

(22) Filed: May 11, 2017

(65) Prior Publication Data

US 2018/0328189 A1    Nov. 15, 2018

(51) Int. Cl.
*F01D 5/18* (2006.01)
*F01D 5/28* (2006.01)
(Continued)

(52) U.S. Cl.
CPC .............. *F01D 5/186* (2013.01); *B23P 15/02* (2013.01); *F01D 5/147* (2013.01); *F01D 5/187* (2013.01);
(Continued)

(58) Field of Classification Search
CPC . F01D 5/186; F01D 5/187; F01D 9/02; F01D 25/12; F01D 5/284; F01D 5/147;
(Continued)

(56) References Cited

U.S. PATENT DOCUMENTS 6,214,248 B1   4/2001   Browning et al.
6,247,896 B1   6/2001   Auxier et al.
(Continued)

FOREIGN PATENT DOCUMENTS

EP    3 103 570 A1   12/2016
EP    3 115 199 A1   1/2017
EP    3 153 484 A1   4/2017

OTHER PUBLICATIONS

Extended European Search Report and Opinion issued in connection with corresponding EP Application No. 18171028.6 dated Nov. 26, 2018.
(Continued)

*Primary Examiner* — Matthew P Travers
(74) *Attorney, Agent, or Firm* — Dority & Manning, P.A.

(57) ABSTRACT

CMC components having microchannels and methods for forming microchannels in CMC components are provided. For example, a method for forming microchannels in a CMC component comprises laying up a plurality of body plies for forming a body of the CMC component; laying up a microchannel ply on the plurality of body plies that has at least one void therein for forming at least one microchannel; laying up a cover ply on the microchannel ply to define an outer layer of the CMC component; and processing the laid up body plies, microchannel ply, and cover ply to form the CMC component. In another embodiment, the method comprises applying an additive matrix to the body plies to define at least one microchannel. In still other embodiments, the method comprises machining at least one microchannel in the plurality of body plies.

13 Claims, 7 Drawing Sheets

(51) Int. Cl.
  *F04D 29/58* (2006.01)
  *F01D 5/14* (2006.01)
  *F04D 29/38* (2006.01)
  *B23P 15/02* (2006.01)
  *F01D 9/02* (2006.01)
  *F01D 25/12* (2006.01)
  *F04D 29/32* (2006.01)
  *F04D 29/54* (2006.01)

(52) U.S. Cl.
  CPC ............... *F01D 5/284* (2013.01); *F01D 9/02* (2013.01); *F01D 25/12* (2013.01); *F04D 29/324* (2013.01); *F04D 29/38* (2013.01); *F04D 29/388* (2013.01); *F04D 29/542* (2013.01); *F04D 29/582* (2013.01); *F04D 29/584* (2013.01); *B23P 2700/06* (2013.01); *F05D 2220/32* (2013.01); *F05D 2230/10* (2013.01); *F05D 2230/50* (2013.01); *F05D 2230/90* (2013.01); *F05D 2250/185* (2013.01); *F05D 2260/202* (2013.01); *F05D 2260/204* (2013.01); *F05D 2300/608* (2013.01); *F05D 2300/6033* (2013.01)

(58) Field of Classification Search
  CPC .... F04D 29/584; F04D 29/388; F04D 29/324; F04D 29/542; F04D 29/582; F04D 29/38; B23P 15/02; B23P 2700/06; F05D 2260/202; F05D 2230/90; F05D 2250/185; F05D 2220/32; F05D 2260/204; F05D 2300/608; F05D 2300/6033
  See application file for complete search history.

(56) References Cited

U.S. PATENT DOCUMENTS

| | | | |
|---|---|---|---|
| 6,499,949 | B2 | 12/2002 | Schafrik et al. |
| 6,528,118 | B2 | 3/2003 | Lee et al. |
| 7,186,091 | B2 | 3/2007 | Lee et al. |
| 7,744,348 | B2 | 6/2010 | Bezencon et al. |
| 8,210,815 | B2 | 7/2012 | Bezencon et al. |
| 8,461,754 | B2 | 6/2013 | Chowdhury et al. |
| 8,753,071 | B2 | 6/2014 | Bunker |
| 2003/0059577 | A1 | 3/2003 | Morrison et al. |
| 2012/0325451 | A1* | 12/2012 | Bunker .................. B24C 1/045 165/185 |
| 2014/0360155 | A1* | 12/2014 | Weber ..................... F01D 5/187 60/39.83 |
| 2015/0143792 | A1* | 5/2015 | Bunker .................. F01D 5/187 60/39.83 |
| 2016/0326886 | A1* | 11/2016 | Lewis ..................... F01D 9/041 |
| 2017/0101873 | A1 | 4/2017 | Morgan et al. |
| 2017/0101932 | A1* | 4/2017 | Stover ..................... F01D 11/08 |
| 2017/0107827 | A1* | 4/2017 | Krumanaker ........... F01D 5/187 |
| 2017/0122113 | A1 | 5/2017 | Kittleson et al. |
| 2017/0306764 | A1* | 10/2017 | Konitzer ................. F01D 5/187 |

OTHER PUBLICATIONS

U.S. Appl. No. 15/174,332, filed Jun. 6, 2016.

\* cited by examiner

CMC COMPONENTS HAVING MICROCHANNELS AND METHODS FOR FORMING MICROCHANNELS IN CMC COMPONENTS

FIELD

The present subject matter relates generally to composite components. More particularly, the present subject matter relates to ceramic matrix composite components having cooling features and methods for forming such cooling features.

BACKGROUND

More commonly, non-traditional high temperature composite materials, such as ceramic matrix composite (CMC) and polymer matrix composite (PMC) materials, are being used in applications such as gas turbine engines. Components fabricated from such materials have a higher temperature capability compared with typical components, e.g., metal components, which may allow improved component performance and/or increased engine temperatures. However, while composite components generally require significantly less or no cooling compared to metal components, cooling composite components still may be desirable, e.g., to extend the life of the components, to further improve component performance, etc.

Improved components having and methods for forming relatively small, near-surface cooling channels in composite components, such as CMC components, would be useful. In particular, near-surface cooling, such as channels directing a flow of cooling fluid in close proximity to an outer surface of a composite component, via relatively small cooling channels would be beneficial to increase cooling effectiveness and thereby decrease the required cooling flow to achieve the desired cooling. As another example, composite components and methods for forming such components in which the size and location of the cooling channels may be optimized to provide an optimum combination of convection and film cooling would be desirable. In general, various methods for forming composite components that include defining at least one microchannel and a supply conduit for providing a flow of cooling fluid to the microchannel would be advantageous.

BRIEF DESCRIPTION

Aspects and advantages of the invention will be set forth in part in the following description, or may be obvious from the description, or may be learned through practice of the invention.

In one exemplary embodiment of the present subject matter, a method for forming microchannels in a ceramic matrix composite (CMC) component is provided. The method comprises laying up a plurality of body plies for forming a body of the CMC component; laying up a microchannel ply on the plurality of body plies, the microchannel ply having at least one void therein for forming at least one microchannel; laying up a cover ply on the microchannel ply, the cover ply defining an outer layer of the CMC component; and processing the laid up body plies, microchannel ply, and cover ply to form the CMC component.

In another exemplary embodiment of the present subject matter, a method for forming microchannels in a ceramic matrix composite (CMC) component is provided. The method comprises laying up a plurality of body plies for forming a body of the CMC component; machining at least one supply conduit in the plurality of body plies; applying an additive matrix to the body plies to define at least one microchannel; and processing the laid up body plies and additive matrix to form the CMC component.

In a further exemplary embodiment of the present subject matter, a method for forming microchannels in a ceramic matrix composite (CMC) component is provided. The method comprises laying up a plurality of body plies for forming a body of the CMC component; machining at least one microchannel in the plurality of body plies; machining at least one supply conduit in the plurality of body plies; laying up a cover ply on the plurality of body plies, the cover ply defining an outer layer of the CMC component; and processing the laid up body plies and cover ply to form the CMC component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
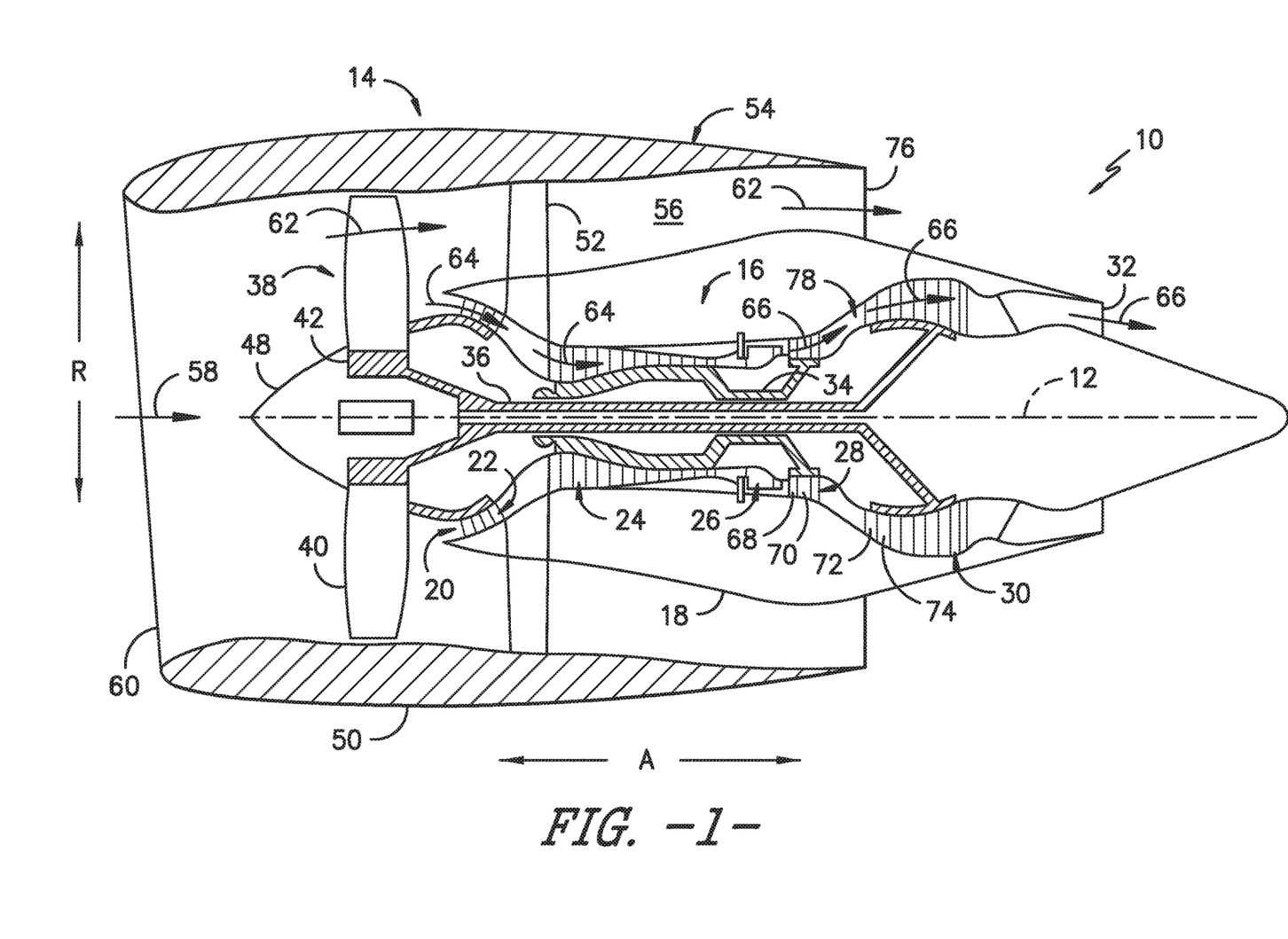
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. However, CMC components may be used in other sections as well, such as the compressor and/or fan sections. Further, CMC components also may be used in other applications, e.g., where the components are subjected to relatively high temperatures.

Figure 2:
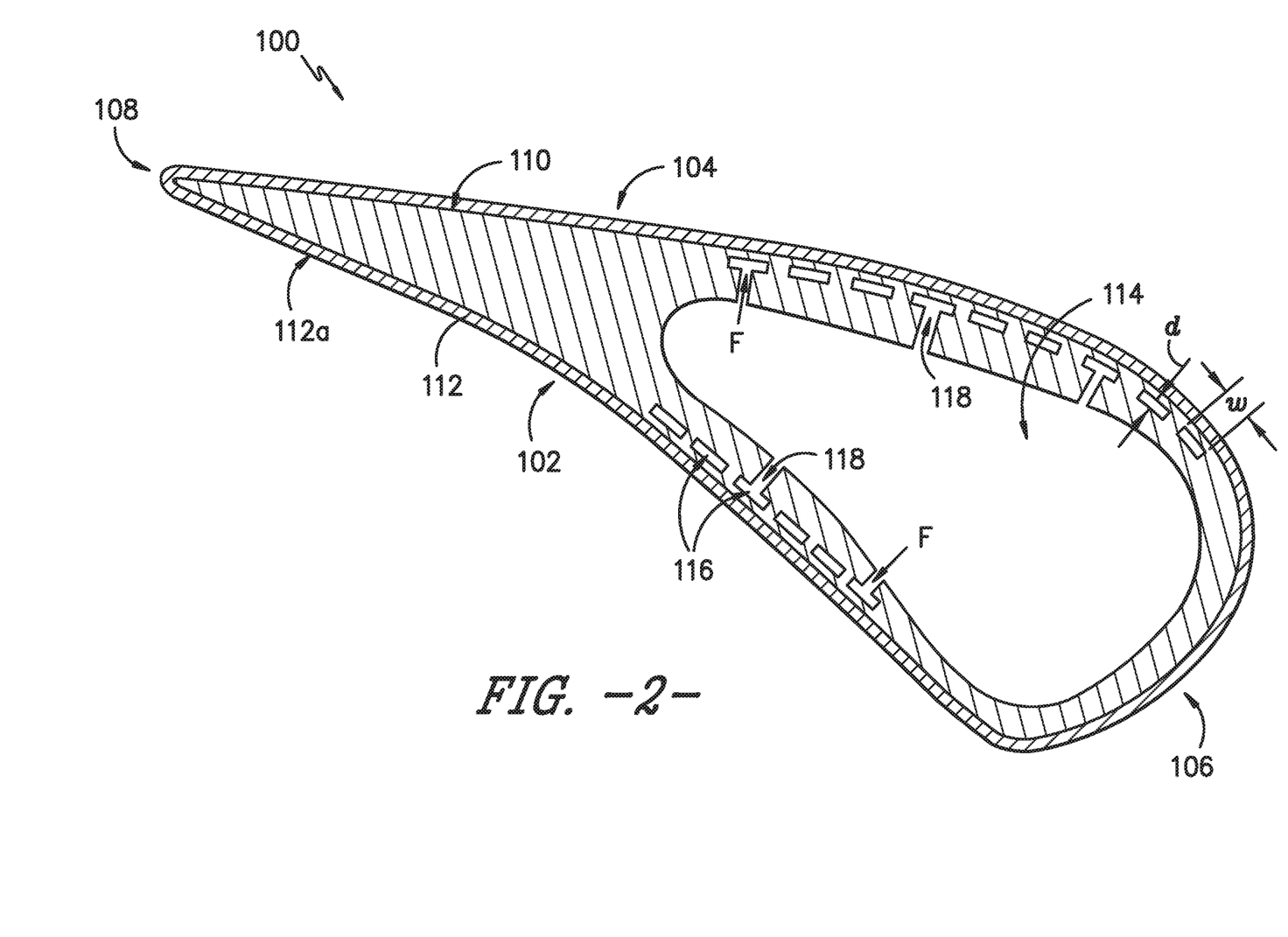
FIG. 2 provides a schematic cross-section view of a CMC airfoil according to an exemplary embodiment of the present subject matter.

FIG. 2 provides a schematic axial cross-section view of a CMC component, more particularly, a CMC airfoil, according to an exemplary embodiment of the present subject matter. As shown in FIG. 2, the CMC airfoil 100 includes a concave pressure side 102 opposite a convex suction side 104. Opposite pressure and suction sides 102, 104 of the airfoil 100 radially extend between an inner end and an outer end along an airfoil span (not shown). Moreover, pressure and suction sides 102, 104 of the airfoil 100 axially extend between a leading edge 106 and an opposite trailing edge 108, and the pressure and suction sides 102, 104 define an outer surface 110 of the CMC airfoil 100. Further, in the illustrated embodiment a coating 112, such as an environmental barrier coating (EBC) or the like, is applied to the outer surface 110.

Also as depicted in FIG. 2, the CMC airfoil 100 defines a cavity 114 that may receive a flow of cooling fluid F, e.g., a flow of pressurized air diverted from HP compressor 24. A plurality of microchannels 116 are defined within the CMC airfoil 100 near the outer surface 110 of the airfoil. Supply conduits 118 extend from the cavity 114 to the microchannels 116 to provide the cooling fluid F to the microchannels 116 for cooling the outer surface 110 of the airfoil 100, e.g., due to the close proximity of the microchannels 116 to the outer surface 110. The microchannels 116 are so named because of their relatively small size; however, it will be appreciated that the microchannels 116 may have any appropriate size for providing an optimum amount of convection and/or film cooling to the outer surface 110 of the airfoil 100, including an outer surface 112a of the coating 112, as described in greater detail herein. The size of the microchannel 116 may refer to its width w, depth d, and overall length l (FIG. 3) between opposing ends. The size of the microchannel 116 may be expressed in other ways as well, such as by its cross-sectional area or the like.

Figure 3:
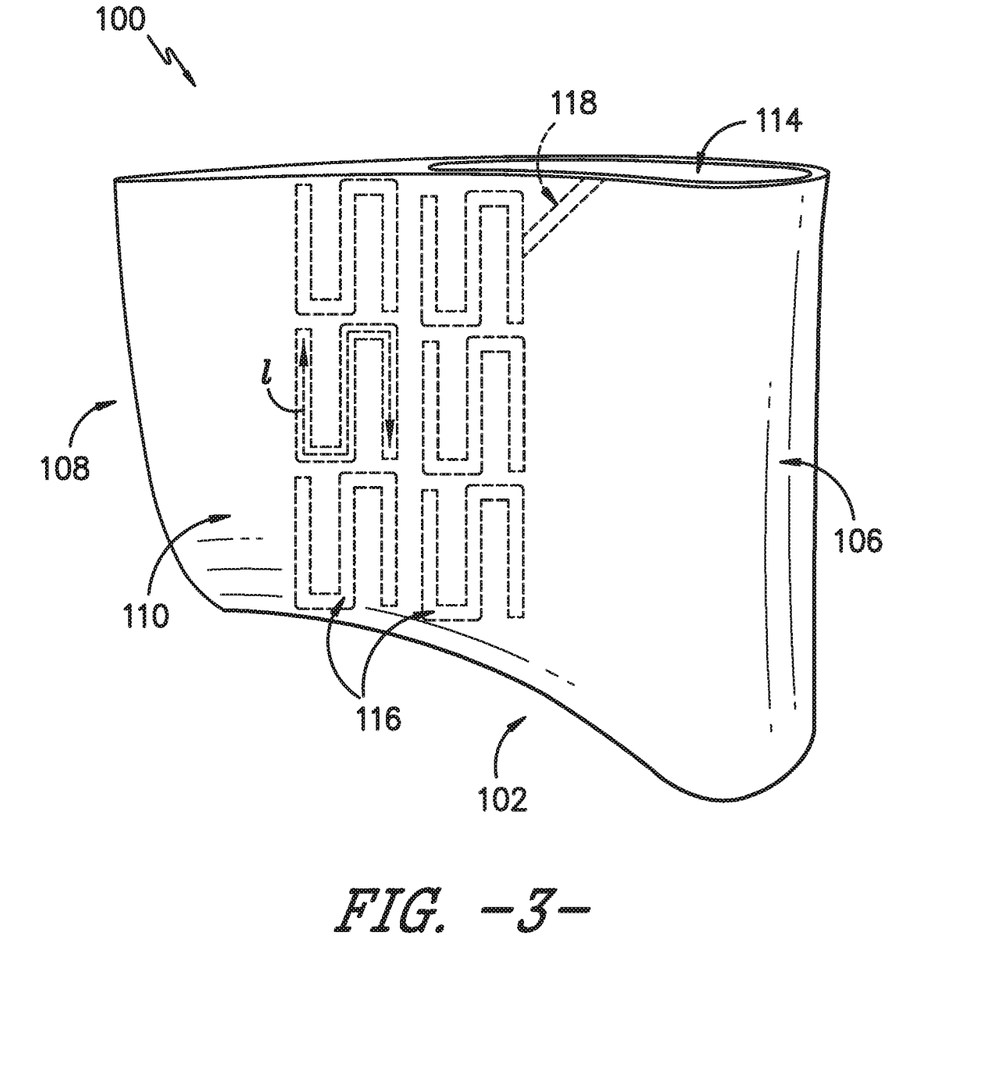
FIG. 3 provides a perspective side view of a portion of the CMC airfoil of FIG. 2 according to an exemplary embodiment of the present subject matter.

FIG. 3 provides a pressure side view of a portion of the CMC airfoil 100 of FIG. 2 without coating 112. As shown in FIG. 3, in some embodiments, each microchannel 116 is defined in a generally serpentine pattern. Further, although one supply conduit 118 is depicted in FIG. 3, it will be appreciated that a supply conduit 118 may extend from the cavity 114 to each serpentine microchannel 116. In other embodiments, each microchannel 116 may extend generally radially or straight along the airfoil span or generally axially or straight along either or both of the pressure side 102 and suction side 104 rather than in a generally serpentine pattern as depicted in FIG. 3. That is, each microchannel 116 may extend along a generally straight line rather than in a generally serpentine pattern. The microchannels 116 may have other shapes or patterns as well. A particular shape and/or pattern of the microchannels 116 may be chosen, for example, to maximize the cooling efficiency of the flow of cooling fluid F through the microchannels. Further, the location of the microchannels 116 in FIGS. 2 and 3 is by way of example only, and it will be appreciated that one or more microchannels 116 may be defined at any suitable location to provide cooling to a desired portion of the airfoil 100. More particularly, the location of the microchannels 116 may be optimized to provide an optimal amount of convection and/or film cooling to the airfoil 100.

Figure 4A:
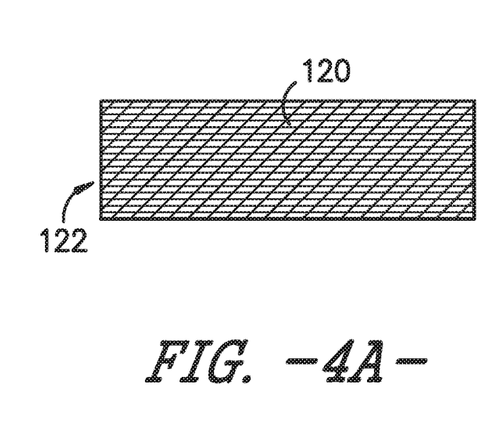
FIGS. 4A through 4E illustrate a method for forming a CMC component having one or more microchannels therein according to an exemplary embodiment of the present subject matter.

The microchannels 116 may be formed in the CMC airfoil 100 in a variety of ways. Turning to FIGS. 4 through 6, various exemplary methods are illustrated for forming microchannels in a CMC component such as the airfoil 100. Referring particularly to FIGS. 4A through 4E, one exemplary method includes laying up a plurality of plies 120 of a CMC material, as shown in FIG. 4A, on a tool, mandrel, mold, or other suitable supporting device or surface. The plurality of plies 120 may be a plurality of CMC plies for forming a body 122 of the CMC component, e.g., CMC airfoil 100, and therefore may be referred to as body plies 120. The body 122 formed by body plies 120 may define a cavity for receipt of a flow of cooling fluid, such as the cavity 114 illustrated in FIGS. 2 and 3 that receives cooling flow F.

Figure 4B:
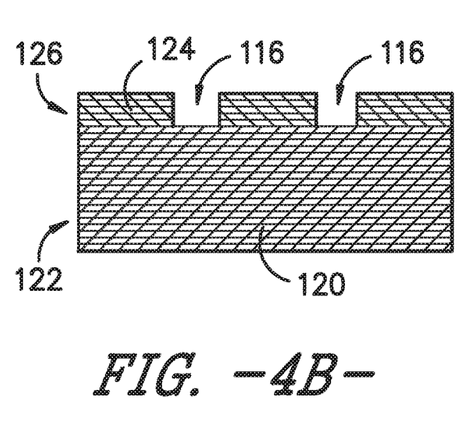

As shown in FIG. 4B, after the body plies 120 are laid up, one or more microchannel plies 124 are laid up on the plurality of body plies 120. Like the body plies 120, the microchannel plies 124 may be CMC plies for forming a portion of the CMC component, such as a microchannel region 126. Each microchannel ply 124 has one or more voids cut therein; the voids define microchannels 116. The voids defining microchannels 116 may be defined in the microchannel plies 124, e.g., by precision cutting the plies 124 using a precision Gerber cutter by Gerber Technology of Tolland, Conn. In other embodiments, another type of cutter or other means may be used to form voids in the microchannel plies 124 that, when laid up with the body plies 120, define one or more microchannels 116 of the CMC component. Other suitable techniques for defining the voids in the plies 124 may be used as well. Further, the microchannels 116 may have any suitable shape or pattern, e.g., a generally serpentine shape shown in FIG. 3 or a generally linear shape, such that the schematic cross-section view of FIG. 4B may illustrate two separate microchannels 116 or one continuous microchannel 116.

Figure 4C:
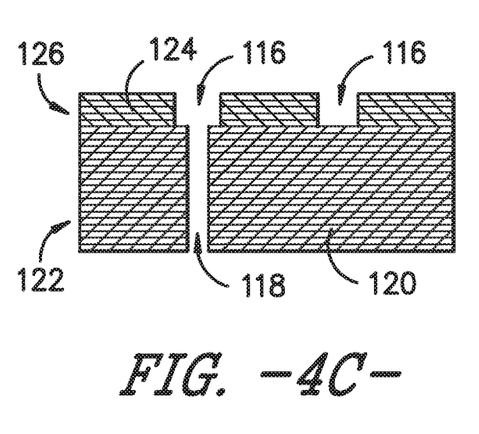

In some embodiments, one or more supply conduits 118 may be defined through the body plies 120 before the microchannel plies 124 are laid up on the plurality of body plies 120. In other embodiments, the one or more supply conduits 118 may be defined through the body plies after the microchannel plies 124 are laid up on the body plies 120, as shown in FIG. 4C. The supply conduits 118 may be defined in the body plies 120, e.g., by electrical discharge machining (EDM), i.e., EDM drilling; laser machining; precision machining; or other suitable machining technique or process. In other embodiments, some of the body plies 120 may define voids therein, similar to the voids defined in microchannel plies 124, such that when the plies 120 are stacked in a ply layup, the voids define the supply conduits 118. Further, as previously described, at least one supply conduit 118 extending from a cavity such as cavity 114 may defined for each microchannel 116 such that each microchannel 116 may be supplied with a flow of cooling fluid F.

Next, the laid up body plies 120 and microchannel plies 124 may be partially processed. For instance, the layup of body and microchannel plies 120, 124 may be compacted and then processed in an autoclave. The compaction may be performed at atmosphere, i.e., at room temperature. The autoclave processing may be performed at a reduced temperature and pressure and for a shorter amount of time compared to a standard autoclave cycle. After such a reduced and shorter autoclave cycle, the body and microchannel plies 120, 124 retain some flexibility and malleability. Such flexibility and malleability may help in laying up other plies and/or defining other features in the body and microchannel plies 120, 124. In some embodiments, the partial processing may be omitted, i.e., the compaction and autoclaving at reduced conditions are optional. Further, in other embodiments, the layup of body and microchannel plies 120, 124 may be compacted prior to defining the one or more supply conduits 118 in the body plies 120. In such embodiments, the layup of body and microchannel plies 120, 124 are compacted, the supply conduit(s) 118 are defined in the body plies 120, and then the layup undergoes a reduced autoclave cycle.

Figure 4D:
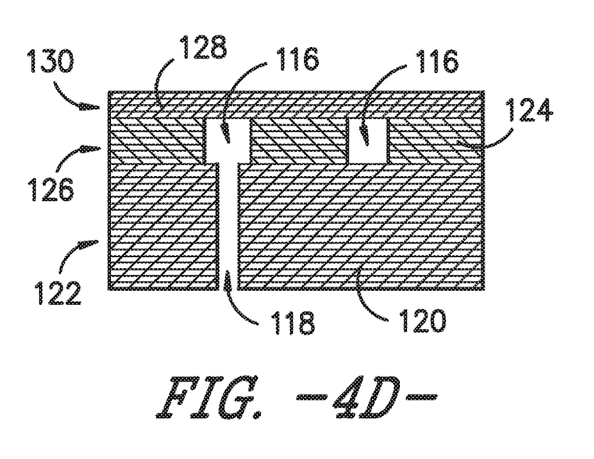

Then, as shown in FIG. 4D, at least one cover ply 128 is laid up on the at least one microchannel ply 124. The cover ply 128 may be a CMC ply for defining an outer layer 130 of the CMC component. The outer layer 130 defines an outer surface of the CMC component, e.g., the outer surface 110 of CMC airfoil 100. Preferably, as few cover plies 128 as possible are laid up on the microchannel plies 124 to keep the outer layer 130 as thin as possible and thereby have the microchannels 116 as close to the outer layer 130 and outer surface as possible to provide near-surface cooling to the component. However, it will be appreciated that a minimum number of cover plies 128 may be required to provide sufficient structure to the CMC component, e.g., to sufficiently define the outer layer 130 of the CMC component.

Alternatively, rather than laying up one or more microchannel plies 124 and then laying up one or more cover plies 128, the one or more microchannel plies 124 may be consolidated with the one or more cover plies 128. Then, the consolidated plies 124, 128 may be laid up with the body plies 120. The supply conduits 118 may be defined in the body plies 120 before or after the consolidated plies 124, 128 are laid up with the body plies 120. The method steps may be performed in various other suitable orders as well.

The layup of plies 120, 124, 128 may be processed to form the CMC component. For example, the layup of plies 120, 124, 128 may be autoclaved using a standard autoclave cycle, rather than a reduced temperature and pressure autoclave cycle as previously described. The component then may undergo firing (or burn-off) and densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. However, densification may be performed using any known densification technique including, but not limited to, Silcomp, melt-infiltration (MI), chemical vapor infiltration (CVI), polymer infiltration and pyrolysis (PIP), and oxide/oxide processes. In one embodiment, densification and firing may be conducted in a vacuum furnace or an inert atmosphere having an established atmosphere at temperatures above 1200° C. to allow silicon or another appropriate material or materials to melt-infiltrate into the component.

Further, the microchannel(s) 116 and/or supply conduit(s) 118 may be filled with a wax, polymer, aggregate, or other suitable fugitive material to help maintain the shape of these voids during compaction and/or densification. For example, after the microchannel(s) 116 are formed, the microchannel(s) 116 may be filled with a fugitive material, and after the supply conduit(s) 118 are formed, the supply conduit(s) 118 may be filled with a fugitive material. The fugitive material may be removed before, during, or after densification, e.g., by melting, leaching, burning, or otherwise removing the fugitive material.

Figure 4E:
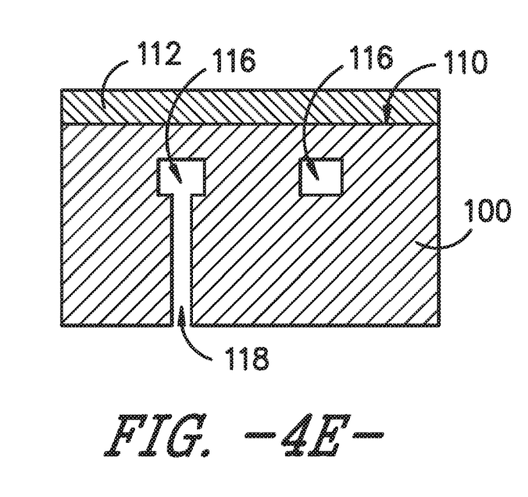

Optionally, after firing and densification the CMC component may be finish machined, if and as needed, and coated with one or more coatings, such as an environmental barrier coating (EBC) 112 as shown in FIG. 4E. Of course, the foregoing method described with respect to FIGS. 4A through 4E is provided by way of example only. As an example, other known methods or techniques for compacting and/or curing CMC plies, as well as for densifying the CMC component, may be utilized. Alternatively, any combinations of these or other known processes may be used. Further, as described above, some portions of the method may be performed in a different order than as shown in FIGS. 4A through 4E.

In an exemplary embodiment, the size of each microchannel 116 relative to the distance of the microchannel 116 to the outer surface 110 of the airfoil may be within a range of about $0.02 < x/d_H < 3.5$, where x is the thickness of the outer layer 130 of cover plies 128 and $d_H$ is the hydraulic diameter of the microchannel 116. Further, the distance between the microchannel 116 and the outer surface 110 (i.e., x) may vary along the length l of the microchannel, and the hydraulic diameter $d_H$ of the microchannel 116 also may vary along the microchannel length l. That is, neither the hydraulic diameter $d_H$ nor the distance x to the outer surface need be constant along the length l of the microchannel 116.

Figure 5A:
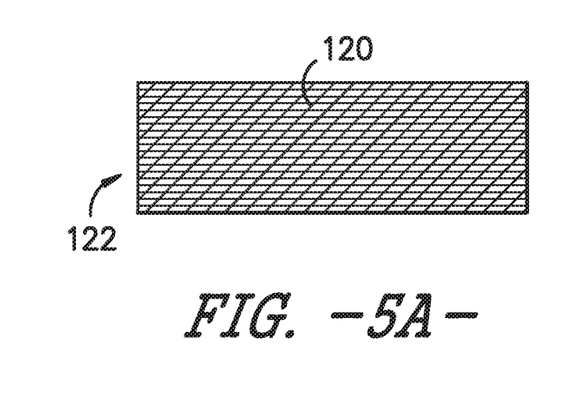
FIGS. 5A through 5D illustrate a method for forming a CMC component having one or more microchannels therein according to another exemplary embodiment of the present subject matter.
Figure 5B:
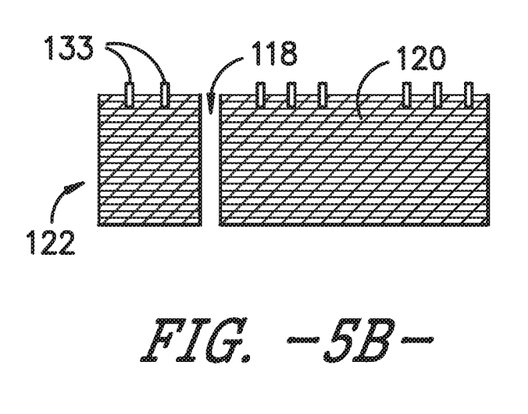

Turning now to FIGS. 5A through 5D, another exemplary method is illustrated for forming microchannels in a CMC component such as the airfoil 100. As shown in FIG. 5A, the method includes laying up a plurality of body plies 120 e.g., on a tool, mandrel, mold, or other suitable supporting device or surface, as described with respect to FIG. 4A. The plurality of body plies 120 form a body 122 of the CMC component, which may define a cavity for receipt of a flow of cooling fluid, such as the cavity 114 illustrated in FIGS. 2 and 3 that receives cooling flow F. As shown in FIG. 5B, after the body plies 120 are laid up, one or more supply conduits 118 may be defined through the body plies 120. The supply conduits 118 may be defined in the body plies 120 using one or more suitable machining processes or techniques as described with respect to FIG. 4C. For example, the supply conduits 118 may be EDM machined or otherwise machined in the body plies 120, or in other embodiments, some of the body plies 120 may define voids such that when the plies 120 are stacked in a ply layup, the voids define the supply conduits 118. Further, as previously discussed, at least one supply conduit 118 may be defined for each microchannel 116, the formation of which is described in greater detail below, such that each microchannel 116 may be supplied with a flow of cooling fluid F.

Next, the laid up body plies 120 having one or more supply conduits 118 defined therein may be partially processed as previously described with respect to FIGS. 4A through 4E. For instance, the layup of body plies 120 may be compacted and then processed in an autoclave. The compaction may be performed at atmosphere, i.e., at room temperature. The autoclave processing may be performed at a reduced temperature and pressure and for a shorter amount of time compared to a standard autoclave cycle. After such a reduced and shorter autoclave cycle, the body plies 120 retain some flexibility and malleability, which may help in laying up other plies and/or defining other features in the body plies 120. In some embodiments, the partial processing may be omitted, i.e., the compaction and autoclaving at reduced conditions are optional. Further, in other embodiments, the layup of body plies 120 may be compacted prior to defining the one or more supply conduits 118 in the body plies 120. In such embodiments, the layup of body plies 120 are compacted, the supply conduit(s) 118 are defined in the body plies 120, and then the layup undergoes a reduced autoclave cycle.

Figure 5C:
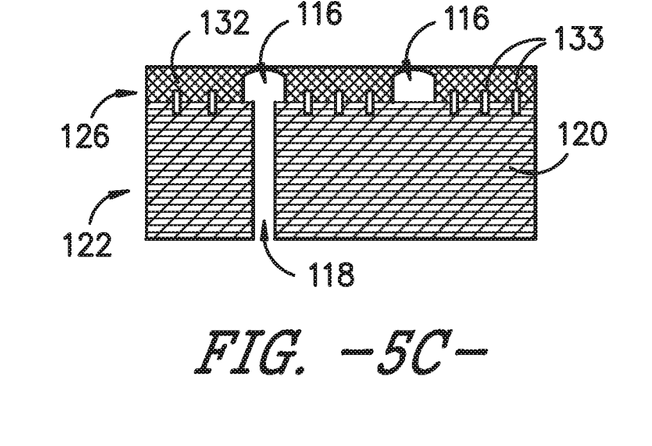

Then, as shown in FIG. 5C, an additive matrix 132 is applied to the layup of body plies 120 to define the microchannel region 126 of the CMC component having at least one microchannel 116. The microchannels 116 may have any suitable shape or pattern, e.g., a generally serpentine shape shown in FIG. 3 or a generally linear shape, such that the schematic cross-section view of FIG. 5C may illustrate two separate microchannels 116 or one continuous microchannel 116. As previously described, at least one supply conduit 118 may extend from the cavity 114 to each microchannel 116 to supply the microchannel with a flow of cooling fluid F. As further illustrated in FIG. 5C, the additive matrix 132 defines an outer surface of the CMC component, e.g., outer surface 110 of airfoil 100, such that the at least one microchannel 116 is defined in close proximity to the outer surface. As such, the flow of cooling fluid F through microchannel 116 provides near-surface cooling to the outer surface of the component.

In some embodiments, as illustrated in FIGS. 5B and 5C, a plurality of fibers or pins 133 may extend beyond the surface of the outermost body ply 120, on which the additive matrix 132 is applied. For example, a plurality of ceramic fibers or pins 133 may extend from the outermost surface of body plies 120, such that the fibers or pins 133 are embedded within the additive matrix 132 as the additive matrix 132 is layered onto the body plies 120 as described in greater detail below. The fibers or pins 133 may thereby enhance fusing between the body plies 120 and the additive matrix 132, forming a mechanical interlock between the component body 120 and the microchannel region 126.

In the exemplary embodiment, the additive matrix 132 is a ceramic matrix material and may be applied using any suitable additive manufacturing technique, such as a 3D printing process. The use of such a process may allow the microchannels 116 to be formed as the additive matrix is applied to the body plies 120, rather than defining voids in one or more microchannel plies 124 before laying up the plies 124 with the body plies 120 as described with respect to FIG. 4B. Thus, the additive manufacturing methods described herein may enable the manufacture of components having various features, configurations, thicknesses, materials, densities, and fluid passageways in a way not possible using prior manufacturing methods.

As used herein, the terms "additively manufactured" or "additive manufacturing techniques or processes" refer generally to manufacturing processes wherein successive layers of material(s) are provided on each other to "build-up," layer-by-layer, a three-dimensional (3D) component. The successive layers generally fuse together to form a monolithic component that may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For instance, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), Laminated Objective Manufacturing (LOM), a binder jet process, and other known processes.

The additive manufacturing processes described herein may be used for forming components using any suitable material. For example, the material may be plastic, metal, concrete, ceramic (such as or including chopped ceramic fibers), polymer, epoxy, photopolymer resin, or any other suitable material that may be in solid, liquid, powder, sheet material, wire, or any other suitable form. More specifically, according to exemplary embodiments of the present subject matter, the additively manufactured microchannel region 126 described herein may be formed in part, in whole, or in some combination of materials including but not limited to ceramic matrix materials such as silicon carbide (SiC), silicon, silica, chopped ceramic fiber, or alumina matrix materials. Where the component is a composite component other than a CMC component, such as a polymer matrix composite component, other suitable composite matrix materials may be used. The materials described above for additively manufacturing the microchannel region 126 are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods. For instance, as described in greater detail with respect to FIGS. 5B and 5C, one or more features may be included for forming a mechanical interlock between components segments, thereby enhancing the fusing of one or more of the layers.

Further, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application.

An exemplary additive manufacturing process will now be described. Additive manufacturing processes fabricate components using three-dimensional (3D) information, for example a three-dimensional computer model, of the component. Accordingly, a three-dimensional design model of the component, or the portion of the component formed by additive manufacturing, may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component or relevant portion thereof.

The design model may include 3D numeric coordinates of the entire configuration of the component or additive portion thereof, including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component, or additive portion thereof, is then "built-up" slice-by-slice, or layer-by-layer, until finished.

In this manner, the microchannel region 126 of the components described with respect to FIGS. 5A through 5D may be fabricated using the additive process, or more specifically, each layer of the additive matrix forming the microchannel region 126 is successively formed, e.g., by successively layering ceramic fibers and/or particles embedded in organic binders or an organic resin. As such, the binders or resin holds each layer of the ceramic fibers and/or particles in place as the successive layers are built up to form the microchannel region 126. Other suitable techniques or processes for additively forming the microchannel region 126 may be used as well.

Each successive layer may be, for example, between about 10 μm and 300 although the thickness may be selected based on any number of parameters and may be any suitable size according to alternative embodiments. Therefore, utilizing the additive formation methods described above, the components or portions thereof described herein may have cross sections as thin as one thickness of an associated layer, e.g., about 10 μm, utilized during the additive formation process.

In addition, utilizing an additive process, the surface finish and features of the components or additive portions thereof may vary as needed depending on the application. In some embodiments, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the additive part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc. Thus, as described with respect to the exemplary method shown in FIGS. 5A through 5D, an additive matrix 132 may be applied to the body plies 120 to form the microchannel region 126 of the CMC component.

After the additive matrix 132 is applied to the body plies 120, the layup of body plies 120 and additive matrix 132 is processed, e.g., as described above with respect to the method illustrated in FIGS. 4A through 4E. More particularly, the layup of plies 120 with the additive matrix 132 thereon may be autoclaved using a partial autoclave cycle, as previously described, or a standard autoclave cycle, i.e., an autoclave cycle at a typical or standard temperature and pressure rather than a reduced temperature and pressure autoclave cycle. The component then may undergo firing (or burn-off) and densification to produce a densified CMC component that is a single piece component, i.e., the component is a continuous piece of CMC material. For instance, after autoclaving, the component may be placed in a furnace for burn-off and densification as previously described, although densification may be achieved using any suitable process or technique. Further, the microchannel(s) 116 and/or supply conduit(s) 118 may be filled with a wax, polymer, aggregate, or other suitable fugitive material to help maintain the shape of these voids during compaction and/or densification. For example, after the microchannel(s) 116 are formed, the microchannel(s) 116 may be filled with a fugitive material, and after the supply conduit(s) 118 are formed, the supply conduit(s) 118 may be filled with a fugitive material. The fugitive material may be removed before, during, or after densification, e.g., by melting, leaching, burning, or otherwise removing the fugitive material.

Figure 5D:
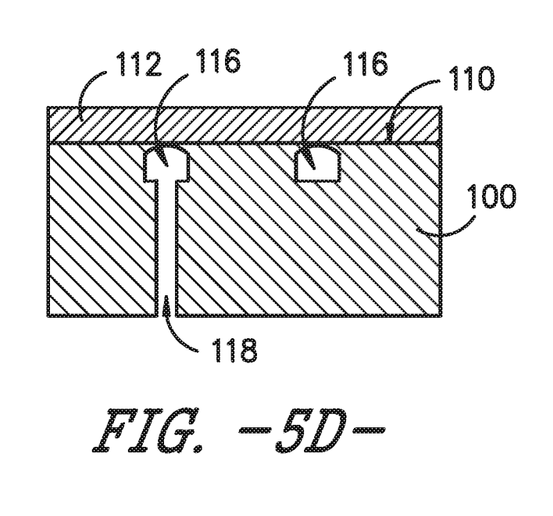

Optionally, after firing and densification the CMC component may be finish machined, if and as needed, and coated with one or more coatings, such as an EBC 112 as shown in FIG. 5D. Further, the foregoing method described with respect to FIGS. 5A through 5D is provided by way of example only. For example, other known methods or techniques for compacting and/or curing CMC plies, as well as for densifying the CMC component, may be utilized. Alternatively, any combinations of these or other known processes may be used. Moreover, as described above, some portions of the method may be performed in a different order than as shown in FIGS. 5A through 5D.

Figure 6A:
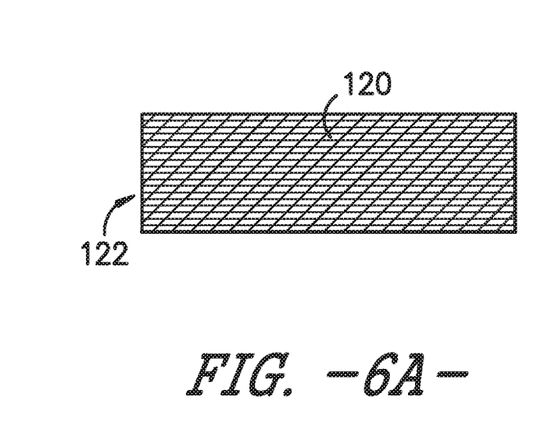
FIGS. 6A through 6E illustrate a method for forming a CMC component having one or more microchannels therein according to yet another exemplary embodiment of the present subject matter.
Figure 6B:
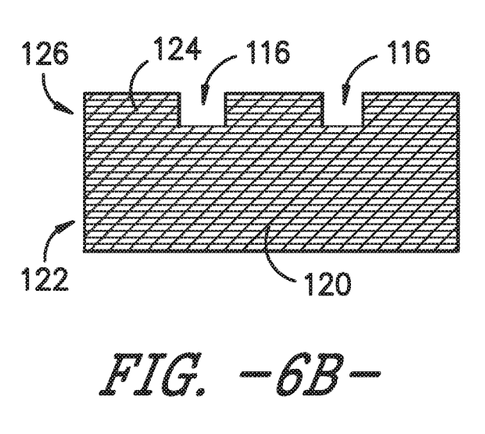
Figure 6C:
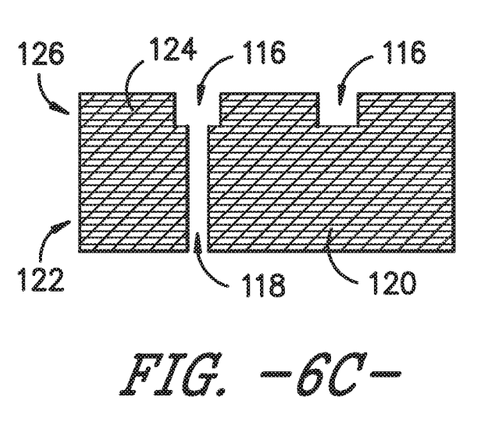

Referring now to FIGS. 6A through 6E, another exemplary method is illustrated for forming microchannels in a CMC component such as the airfoil 100 described with respect to FIGS. 2 and 3. As shown in FIG. 6A, the method includes laying up a plurality of body plies 120 e.g., on a tool, mandrel, mold, or other suitable supporting device or surface, as described with respect to FIG. 4A. The plurality of body plies 120 form a body 122 of the CMC component, which may define a cavity for receipt of a flow of cooling fluid, such as the cavity 114 illustrated in FIGS. 2 and 3 that receives cooling flow F. After the body plies 120 are laid up, one or more microchannels 116 are defined in the body plies 120, as shown in FIG. 6B, and then one or more supply conduits 118 are defined in the body plies 120, as shown in FIG. 6C. The microchannels 116 and supply conduits 118 may be defined in the body plies 120 as described with respect to FIG. 4C, e.g., using one more machining processes or techniques or other suitable techniques for defining voids in a ply layup. For example, the microchannels 116 and supply conduits 118 may be EDM machined or otherwise machined in the body plies 120, or in other embodiments, some of the body plies 120 may define voids such that when the plies 120 are stacked in a ply layup, the voids define the microchannels 116 and/or supply conduits 118. Further, as previously discussed, at least one supply conduit 118 may defined for each microchannel 116, such that each microchannel 116 may be supplied with a flow of cooling fluid F. The microchannels 116 may have any suitable shape or pattern, e.g., a generally serpentine shape shown in FIG. 3 or a generally linear shape, such that the schematic cross-section view of FIG. 6C may illustrate two separate microchannels 116 or one continuous microchannel 116.

Next, the laid up body plies 120, having one or more microchannels 116 and one or more supply conduits 118 defined therein, may be partially processed as previously described with respect to FIGS. 4A through 4E. For instance, the layup of body plies 120 may be compacted and then processed in an autoclave. The compaction may be performed at atmosphere, i.e., at room temperature. The autoclave processing may be performed at a reduced temperature and pressure and for a shorter amount of time compared to a standard autoclave cycle. After such a reduced and shorter autoclave cycle, the body plies 120 retain some flexibility and malleability, which may help in laying up other plies and/or defining other features in the body plies 120. In some embodiments, the partial processing may be omitted, i.e., the compaction and autoclaving at reduced conditions are optional. Further, in other embodiments, the layup of body plies 120 may be compacted prior to defining the one or more microchannels 116 in the body plies 120. In such embodiments, the body plies 120 are laid up then compacted, the microchannel(s) 116 and supply conduit(s) 118 are defined in the body plies 120, and then the layup undergoes a reduced autoclave cycle.

Figure 6D:
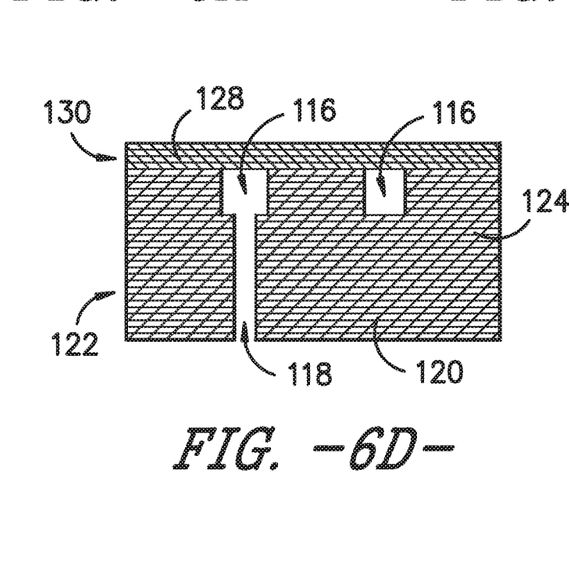

Then, as shown in FIG. 6D, at least one cover ply 128 is laid up on the body plies 120. As described with respect to FIG. 4D, the cover ply 128 may be a CMC ply for defining an outer layer 130 of the CMC component. The outer layer 130 defines an outer surface of the CMC component, e.g., the outer surface 110 of CMC airfoil 100. Preferably, as few cover plies 128 as possible are laid up on the microchannel plies 124 to keep the outer layer 130 as thin as possible and thereby have the microchannels 116 as close to the outer layer 130 and outer surface as possible to provide near-surface cooling to the component. However, it will be appreciated that a minimum number of cover plies 128 may be required to provide sufficient structure to the CMC component, e.g., to sufficiently define the outer layer 130 of the CMC component.

After the cover ply or plies 128 are laid up on the body plies 120, which have at least one microchannel 116 and at least one supply conduit 118 defined therein, the layup of plies 120, 128 may be processed to form the CMC component, e.g., as described above with respect to the method illustrated in FIGS. 4A through 4E. More particularly, the layup of plies 120, 128 may be autoclaved using a standard autoclave cycle, rather than a reduced temperature and pressure autoclave cycle as previously described. The component then may undergo firing (or burn-off) and densification to produce a densified CMC component that is a single piece component, i.e., the component is a continuous piece of CMC material. For instance, after autoclaving, the component may be placed in a furnace for burn-off and densification as previously described, although densification may be achieved using any suitable process or technique. Further, the microchannel(s) 116 and/or supply conduit(s) 118 may be filled with a wax, polymer, aggregate, or other suitable fugitive material to help maintain the shape of these voids during compaction and/or densification. For example, after the microchannel(s) 116 are formed, the microchannel(s) 116 may be filled with a fugitive material, and after the supply conduit(s) 118 are formed, the supply conduit(s) 118 may be filled with a fugitive material. The fugitive material may be removed before, during, or after densification, e.g., by melting, leaching, burning, or otherwise removing the fugitive material.

Figure 6E:
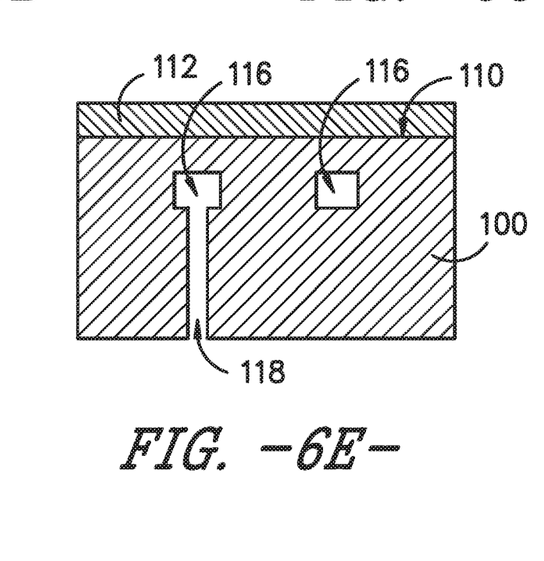

Optionally, after firing and densification the CMC component may be finish machined, if and as needed, and coated with one or more coatings, such as an EBC 112 as shown in FIG. 6E. Further, the foregoing method described with respect to FIGS. 6A through 6E is provided by way of example only. For example, other known methods or techniques for compacting and/or curing CMC plies, as well as for densifying the CMC component, may be utilized. Alternatively, any combinations of these or other known processes may be used. Moreover, as described above, some portions of the method may be performed in a different order than as shown in FIGS. 6A through 6E.

In an exemplary embodiment, the size of each microchannel 116 relative to the distance of the microchannel 116 to the outer surface 110 of the airfoil may be within a range of about $0.02 < x/d_H < 3.5$, where x is the thickness of the outer layer 130 of cover plies 128 and $d_H$ is the hydraulic diameter of the microchannel 116. Further, the distance between the microchannel 116 and the outer surface 110 (i.e., x) may vary along the length l of the microchannel, and the hydraulic diameter $d_H$ of the microchannel 116 also may vary along the microchannel length l. That is, neither the hydraulic diameter $d_H$ nor the distance x to the outer surface need be constant along the length l of the microchannel 116.

Figure 7A:
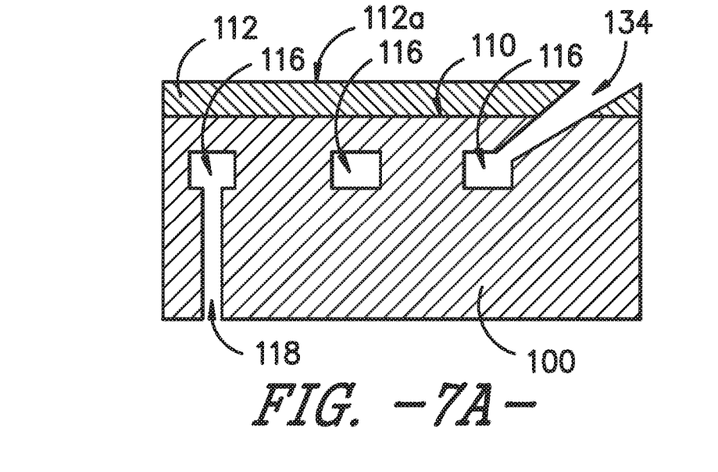
FIGS. 7A through 7C illustrate various methods for forming film cooling holes in a CMC component having one or more microchannels therein according to an exemplary embodiment of the present subject matter.
Figure 7B:
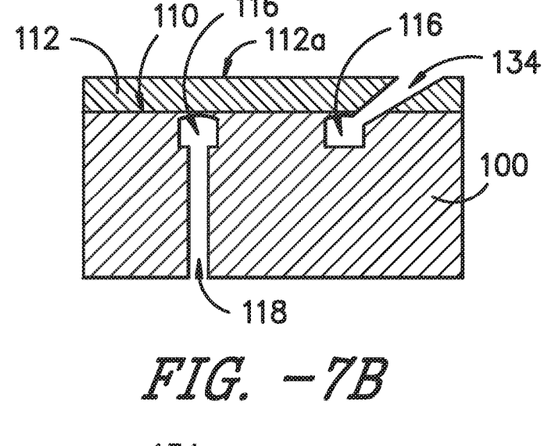
Figure 7C:
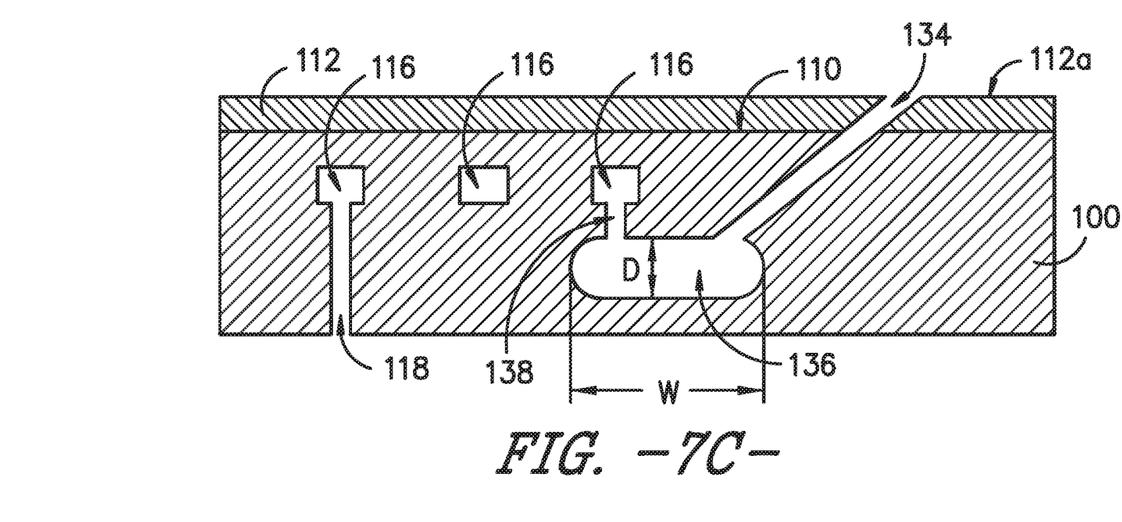

Turning now to FIGS. 7A through 7C, the various methods described above for defining microchannels in CMC components also may include defining film cooling holes from an outer surface of the component to the one or more microchannels. The film cooling holes 134, for example, provide a passageway for the cooling fluid F from the microchannel(s) 116 to the outer surface of the component, such as the outer surface 110 of airfoil 100 or, where a coating 112 is applied to the airfoil 100, an outer surface 112a of the coating 112. Moreover, each film cooling hole 134 may be configured to provide a film of cooling fluid over the outer surface. In some embodiments, in addition to or as an alternative to film cooling holes 134, other types of holes, slots, or the like may be defined from the one or more microchannels 116 to allow the flow F to exit to a lower pressure environment.

Referring particularly to FIG. 7A, as described with respect to FIGS. 4 and 6, one or more microchannels 116 may be formed in microchannel plies 124 or body plies 120 and then covered with cover plies 128. After processing the plies and, optionally, applying a coating 112 as described with respect to FIGS. 4E and 6E, a film cooling hole 134 may be machined or otherwise defined from the outer surface 112a of the coating 112 to a microchannel 116. Similarly, referring to FIG. 7B, a film cooling hole 134 may be defined from the outer surface 112a of the coating 112 to a microchannel 116 formed through the application of an additive matrix to a plurality of CMC body plies as described with respect to FIGS. 5A through 5D. Thus, as shown in FIGS. 7A and 7B, cooling fluid F may be supplied from the microchannel 116 to the outer surface of the component through the film cooling hole 134.

In some embodiments, more than one film cooling hole 134 may be defined from the outer surface 112a to one microchannel 116. That is, each microchannel 116 extends over a length l from one end to another, e.g., as depicted in FIG. 3, such that more than one film cooling hole 134 may be defined along the length of the microchannel 116. Further, in some embodiments, at least one film cooling hole 134 may be defined in the component from the outer surface to each microchannel 116. In other embodiments, the film cooling holes 134 may extend to some microchannels 116 but not all microchannels 116 defined in the component; rather, another type of hole, a slot, or the like may be defined in the component to allow the flow F through microchannels 116 without a film cooling hole 134 to exit to a lower pressure.

Referring now to FIG. 7C, in some embodiments, the methods described above also may include defining a film cooling cavity 136 that receives a flow of cooling fluid F from one or more microchannels 116 through a film supply conduit 138. Then, the one or more film cooling holes 134 may be defined from the outer surface of the component, e.g., from outer surface 110 of airfoil 100 or from outer surface 112a of a coating 112 applied to the component, to the film cooling cavity 136. As such, a flow of cooling fluid F may be supplied to the outer surface of the component from the film cooling cavity 136 through the film cooling hole 134. Because the microchannels 116 preferably are very small, e.g., in width and depth, the film cooling cavity 136 may provide a better target for machining the film cooling holes 134. That is, machining the film cooling holes 134 to the microchannels 116 may cause drilling backstrikes and/or prohibit shaping of the film cooling holes 134 due to the relatively small target area provided by the microchannels 116 into which the film cooling holes 134 may be machined. Therefore, the film cooling cavity 136 may have a width W and depth D that provides a sufficient target for machining the film cooling holes 134 while avoiding the backstrike, shaping, and/or other problems that may arise from an inadequate supply cavity size. More particularly, the film cooling cavity 136 has a larger width W and a larger depth D than the width w and depth d of the microchannels 116. Further, the film cooling holes 134 may be defined in the component using any suitable process or technique, e.g., EDM drilling, laser machining, precision machining, or the like. For instance, rather than machining the film cooling holes 134 in the CMC component after the coating 112 is applied, the film cooling holes 134 may be defined in the microchannel plies 124 and cover plies 128, e.g., as described above with respect to forming voids in the microchannel plies 124, such that the film cooling holes 134 are formed as the plies 124, 128 are laid up. Then, an opening from the outer surface 112a of the coating 112 to each film cooling hole 134 may be machined after the coating 112 is applied. Alternatively, the film cooling holes 134 may be defined as the additive matrix 132 is applied, e.g., as described with respect to forming microchannels 116 as the additive matrix 132 is applied, or the film cooling holes 134 may be machined in the microchannel and cover plies 124, 128 before the body plies, microchannel plies, and cover plies 120, 124, 128 are processed as previously described. The film cooling holes 134 also may be defined in other ways or at other points in the methods described with respect to FIGS. 4 through 6.

It will be appreciated that the film cooling cavity 136 and film supply conduit 138 may be defined in the component at any suitable point in the methods described with respect to FIGS. 4 through 6. For example, in one embodiment of the method described with respect to FIGS. 4A through 4E, at least one film cooling cavity 136 and film supply conduit 138 is defined in the body plies 120 after the body plies 120 are laid up but before the microchannel plies 124 are laid up on the body plies 120. The cavity 136 and supply conduit 138 may be defined using a similar process or technique used to define the supply conduits 118. In other embodiments, some of the body plies 120 may have a cut-out or void defined therein for defining the film cooling cavity 136 as the body plies 120 are laid up, and some of the body plies 120 may have a cut-out or void defined therein for defining the film supply conduit 138 as the body plies 120 are laid up. The film cooling cavity 136 and film supply conduit 138 may be defined in the component formed using the method described with respect to FIGS. 4A through 4E at other points in the method or utilizing different processes or techniques. Similarly, the film cooling cavity 136 and film supply conduit 138 may be defined in the component formed using the method described with respect to FIGS. 5A through 5D or the method described with respect to FIGS. 6A through 6E at any suitable point in the respective method.

Therefore, as described herein with respect to the various exemplary embodiments, relatively small cooling channels may be precisely defined in specific near-surface locations in composite components, such as CMC airfoils, CMC shrouds, CMC combustors, or any composite component for which cooling is desirable. The near-surface cooling microchannels direct a flow of cooling fluid in close proximity to an outer surface of the composite component, e.g., to increase cooling effectiveness and thereby decrease the cooling flow required to achieve the desired cooling. The size and location of the near-surface cooling channels and/or film cooling holes may be selected to optimize convection and/or film cooling of the component. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming microchannels in a ceramic matrix composite (CMC) component, the method comprising:
   laying up a plurality of body plies for forming a body of the CMC component;
   laying up a microchannel ply on the plurality of body plies, the microchannel ply having at least one void therein for forming at least one microchannel;
   laying up a cover ply on the microchannel ply, the cover ply defining an outer layer of the CMC component;
   processing the laid up body plies, microchannel ply, and cover ply to form the CMC component;
   forming a film cooling cavity having a width larger than a width of the at least one microchannel, a depth larger than a depth of the at least one microchannel, or both, the entirety of the film cooling cavity being located farther from an outer surface of the CMC component than is the at least one microchannel, the film cooling cavity in airflow communication with the at least one microchannel; and forming at least one film cooling hole through the outer surface of the CMC component and through the body plies, the cover ply or both, and to the film cooling cavity to supply a film of cooling fluid from the at least one microchannel to the outer surface of the CMC component.

2. The method of claim 1, further comprising:
machining at least one supply conduit in the plurality of body plies,
wherein the at least one supply conduit extends from a cavity defined by the body plies to the at least one microchannel.

3. The method of claim 2, wherein the at least one supply conduit is machined in the plurality of body plies after laying up the microchannel ply and prior to laying up the cover ply.

4. The method of claim 2, wherein the at least one supply conduit is machined in the plurality of body plies after laying up the plurality of body plies and prior to laying up the microchannel ply.

5. The method of claim 2, wherein forming at least one film cooling hole from the outer surface of the CMC component through the cover ply to supply the film of cooling fluid from the at least one microchannel to the outer surface of the CMC component comprises machining at least one film cooling hole from the outer surface of the CMC component through the cover ply.

6. The method of claim 1, further comprising:
autoclaving the laid up plurality of body plies and the microchannel ply at a temperature and pressure at which the body plies and the microchannel ply retain some flexibility, prior to laying up the cover ply on the microchannel ply.

7. The method of claim 1, further comprising:
applying a coating to the CMC component wherein forming at least one film cooling hole through the outer surface of the CMC component comprises machining at least one film cooling hole through the coating and the cover ply of the CMC component to the at least one microchannel to supply a film of cooling fluid from the at least one microchannel to the outer surface of the CMC component.

8. The method of claim 1, wherein the at least one microchannel is defined in a serpentine pattern.

9. The method of claim 1, wherein the at least one microchannel extends along a straight line.

10. The method of claim 1, wherein forming at least one film cooling hole from the outer surface of the CMC component through the body plies, the cover ply or both to supply the film of cooling fluid from the at least one microchannel to the outer surface of the CMC component comprises forming at least one film cooling hole from the outer surface of the CMC component through the body plies.

11. The method of claim 1, wherein forming at least one film cooling hole through the outer surface of the CMC component and through the body plies, the cover ply, or both to supply the film of cooling fluid from the at least one microchannel to the outer surface of the CMC component comprises forming the at least one film cooling hole from the outer surface of the CMC component through the cover ply.

12. The method of claim 1, wherein forming the film cooling cavity comprises machining the film cooling cavity in the body plies.

13. The method of claim 1, wherein the film cooling cavity is located farther from an outer surface of the CMC component than the at least one film cooling hole.

\* \* \* \* \*